US006942285B2

(12) United States Patent

Manders et al.

(10) Patent No.: US 6,942,285 B2
(45) Date of Patent: Sep. 13, 2005

(54) VEHICLE AND ROOF ASSEMBLY

(75) Inventors: Peter Christiaan Leonardus Johannes Manders, Horst (NL); Egbert Boersma, Helmond (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 10/349,979

(22) Filed: Jan. 23, 2003

(65) Prior Publication Data

US 2003/0141748 A1 Jul. 31, 2003

(30) Foreign Application Priority Data

Jan. 25, 2002 (EP) ............................................ 02075505

(51) Int. Cl.$^{7}$ ................................................ B60J 7/047
(52) U.S. Cl. .................................. 296/216.03; 296/223
(58) Field of Search ............................ 296/216.03, 223

(56) References Cited

U.S. PATENT DOCUMENTS

| | | | | |
|---|---|---|---|---|
| 4,699,421 A | | 10/1987 | Schaetzler et al. | 296/221 |
| 5,069,501 A | | 12/1991 | Baldwin et al. | 296/223 |
| 5,531,501 A | | 7/1996 | Nabuurs | 296/223 X |
| 5,618,081 A | | 4/1997 | Nabuurs | 296/216.03 |
| 6,158,803 A | * | 12/2000 | Reihl et al. | 296/216.04 |
| 6,419,309 B1 | | 7/2002 | Kaandorp et al. | 296/216.03 |
| 6,494,529 B1 | * | 12/2002 | Manders | 296/222 |
| 6,568,750 B2 | * | 5/2003 | Radmanic et al. | 296/216.03 |
| 6,572,183 B2 | * | 6/2003 | Wingen et al. | 296/216.03 |
| 6,619,732 B2 | * | 9/2003 | Radmanic | 296/216.03 |

FOREIGN PATENT DOCUMENTS

| | | |
|---|---|---|
| DE | 4238945 | 11/1993 |
| DE | 196 35 145 C | 10/1997 |
| EP | 0403388 | 12/1990 |
| EP | 0 657 316 A | 7/1995 |
| EP | 1052126 | 11/2000 |

* cited by examiner

*Primary Examiner*—Dennis H. Pedder
(74) *Attorney, Agent, or Firm*—Westman, Champlin & Kelly, P.A.

(57) ABSTRACT

A vehicle has a roof assembly for opening an opening in its fixed roof. The roof assembly includes a frame attached to the vehicle roof and a panel which is movably supported by said stationary part and which can be adjusted by an adjusting mechanism including a driving slide. The panel is movable between a closed position for closing the roof opening, and an open, rearward position for being at least partially above the roof behind the roof opening, in which the roof opening is at least partially released. The frame is fitted with at least one front longitudinal guide track extending at least along the roof opening, whereas a rear longitudinal guide track is mounted at least substantially rearward of the roof opening. The closure element is supported near its front side by a front support which is movably guided by said front longitudinal guide track, and which is supported rearwards thereof by a lifting device comprising a guiding device for engagement in said rear longitudinal guide track upon rearward movement of the panel. The lifting device is adapted to tilt the panel from the closed position in the roof opening to an upwardly inclined venting position on the one hand and to move the panel from the closed position rearwardly on the other hand.

30 Claims, 10 Drawing Sheets

VIIa
VIIb
VIIc

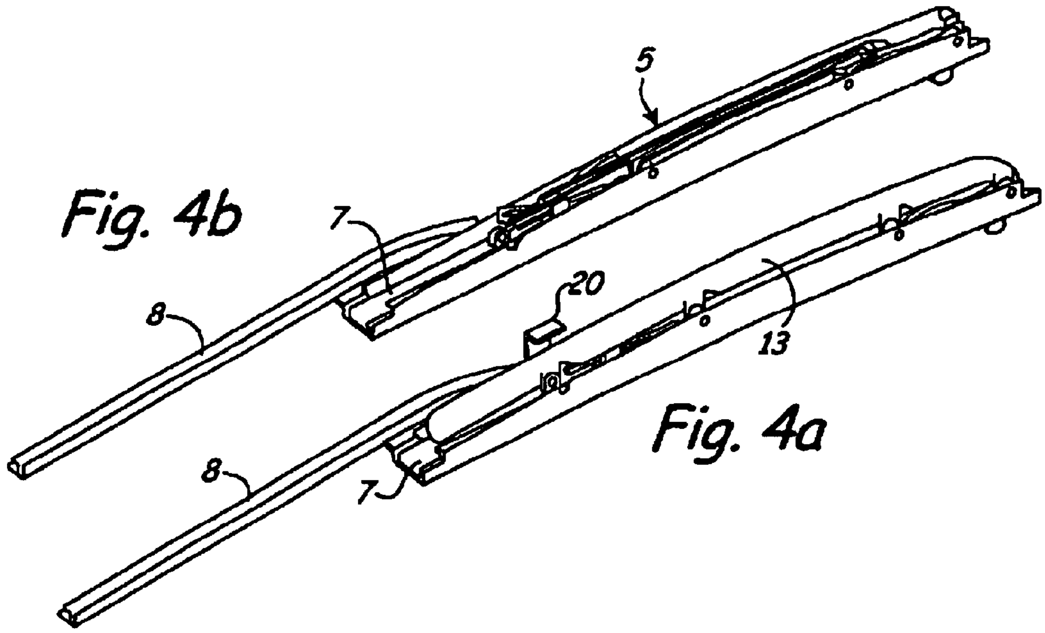
Fig. 4b
Fig. 4a
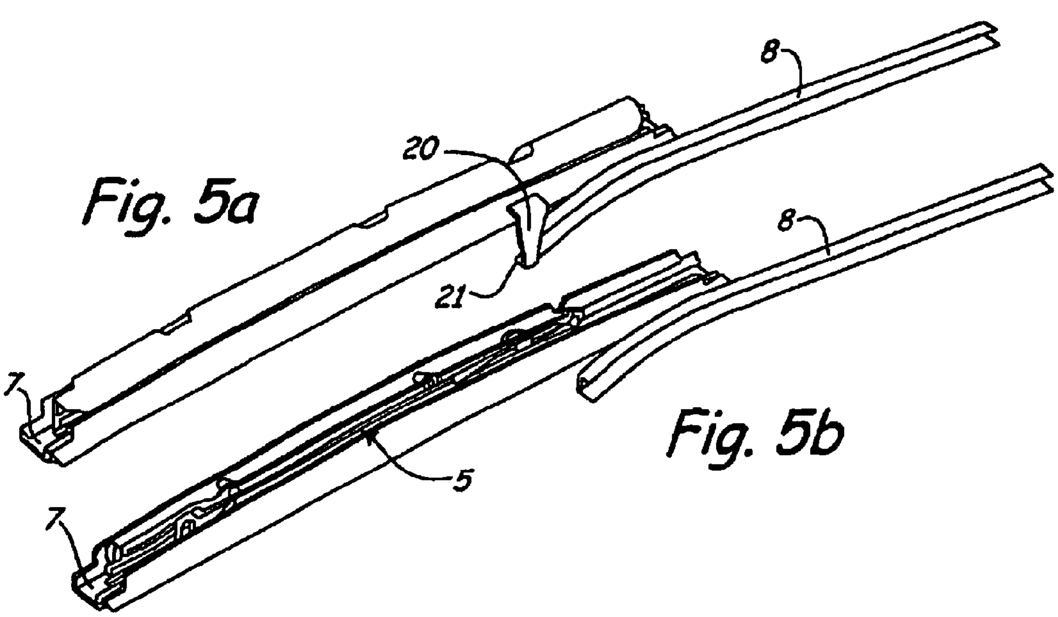
Fig. 5a
Fig. 5b

VEHICLE AND ROOF ASSEMBLY

BACKGROUND OF THE INVENTION

The present invention relates to a vehicle having an roof assembly that includes a moveable closure element.

Such a roof assembly is known, for example from DE-C-42 38 944, DE-C-42 38 945, WO-A-98/14342 or WO-A-00/29235. The object of the present invention is to provide a new and improved roof assembly.

SUMMARY OF THE INVENTION

In order to accomplish that objective, the roof assembly according to the invention includes a lifting device that is adapted to tilt a closure element or panel from a closed position to an upwardly inclined position and to move the closure element from the closed position rearwardly.

Due to the features of the invention, there is created a separate venting position which is independent from the rearward movement of the closure element to an open position.

The advantage is that the maximum venting position can be chosen at will without being bound by a corresponding rearward movement of the closure element. Also, in the independent rearward movement, the height of the closure element can be optimized without having to take into account the venting position of the closure element.

In an advantageous embodiment, the lifting device includes at least one guide curve which is in engagement with a lifting control element of the driving slide. In one embodiment, the lifting device includes two guide curves, one connected to the closure element and one connected to the stationary part, the lifting control element of the driving slide being in engagement with both guide curves and being adjustable in a vertical direction.

Due to these features, there is no need for a lifting lever, thereby creating a simple, stable and reliable structure allowing a low built-in height of the lifting device.

In a further embodiment, the guide curve is connected to the stationary part is substantially V-shaped in a side view, said lifting control element of the driving slide being positioned at the bottom or lowermost portion of the V-shape when the closure element is in the closed position. In this case each leg of the V-shape determines the vertical movement of the closure element, one to the venting position and one to the rearwardly displaced open position.

In one embodiment, the guiding device includes a guide cam fixed to the closure element, whereas in an alternative embodiment, the guiding device includes a carriage rotatably connected to the closure element and having at least one and preferably two guide members which are in engagement with the rear longitudinal guide track.

In both embodiments, the rear longitudinal guide track can include a front portion which is curved downwardly.

In this manner the guiding device can be used for lifting the rear of the closure element when it is moved to an open position.

The invention will hereafter be explained in more detail with reference to the drawings, showing in a very simple form the principles of an embodiment of the roof assembly according to the invention.

BRIEF DESCRIPTION OF THE DRAWINGS

FIGS. 4*a* and 4*b* are a perspective view showing the assembly of parts of FIG. 2 with and without a side bracket.

FIGS. 5*a* and 5*b* are views corresponding to FIG. 4 but viewed from the side of FIG. 3.

FIGS. 8*a*–8*f* are views corresponding to those of FIG. 1*a*–1*f* and illustrate enlarged section views of front and rear portions.

DETAILED DESCRIPTION OF THE PREFERRED EMBODIMENTS

Figure 8A:
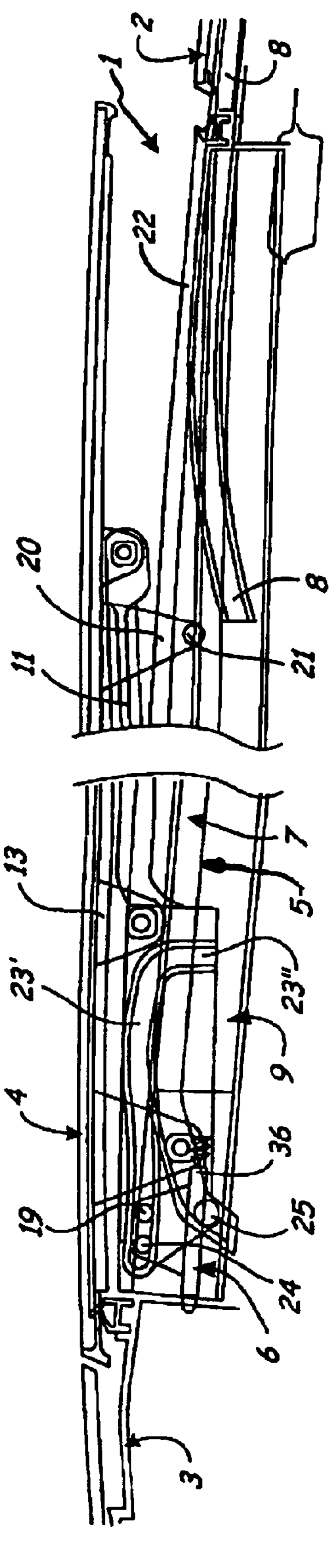

The drawings show an embodiment of a roof assembly for a vehicle, in particular a motor vehicle such as a passenger car. As is shown in FIG. 1 and FIG. 8*a*, this vehicle is provided with an opening 1 in its fixed roof 2, whereby it is noted that said fixed roof 2 may either form part of the vehicle or of the roof assembly itself, which in that case makes up the entire roof of the vehicle. Likewise, elements of the roof assembly can be attached to or formed integral with portions of the vehicle roof. The fixed roof 2 may consist of an integral part of the vehicle or of one or more (transparent) panels, which may be removable or form a separate adjustable roof element.

Figures 1A, 1B, 1C:
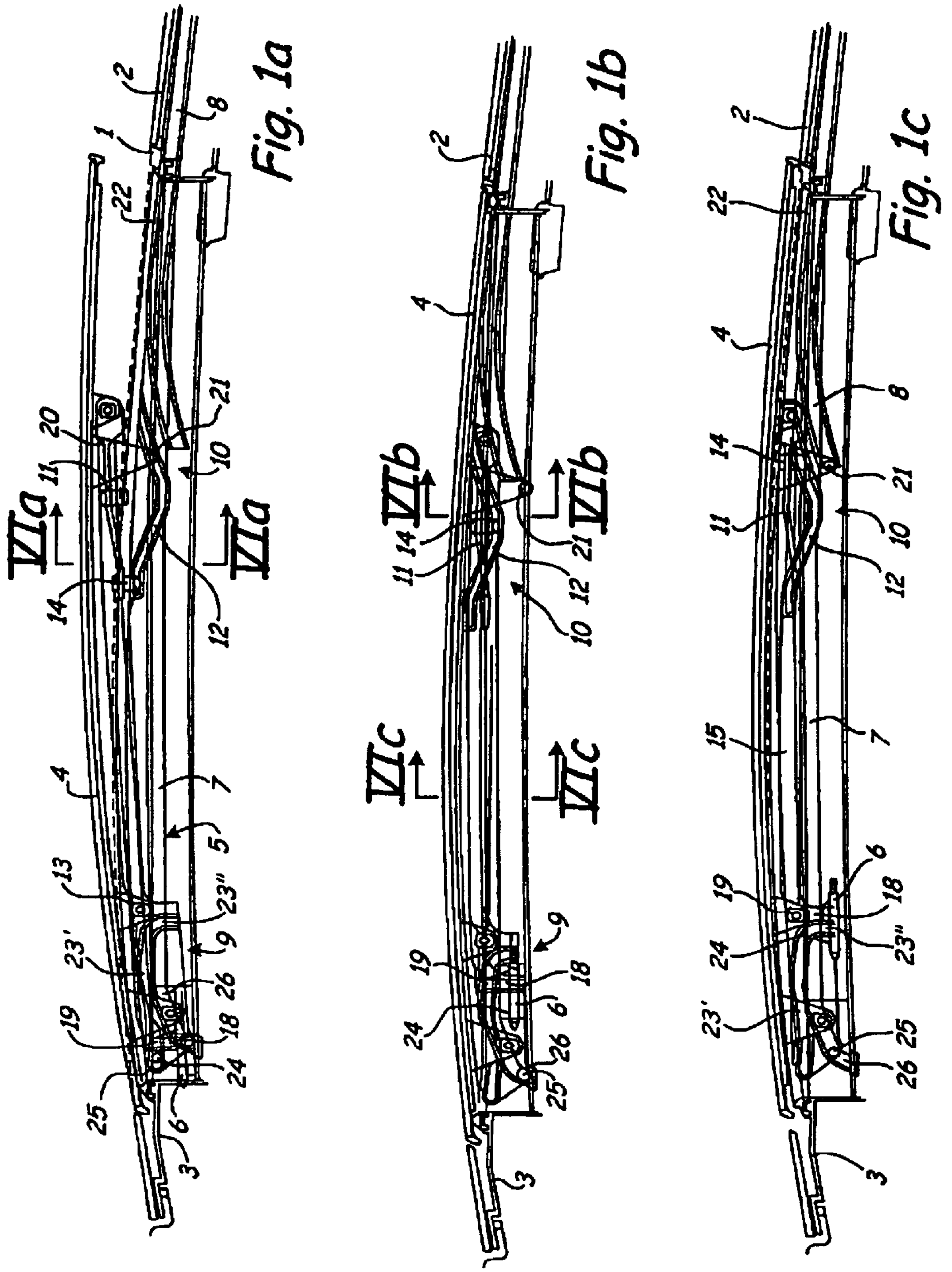
FIGS. 1*a*–1*f* are longitudinal sectional views of the vehicle roof showing the roof assembly in different positions.
Figure 1D:
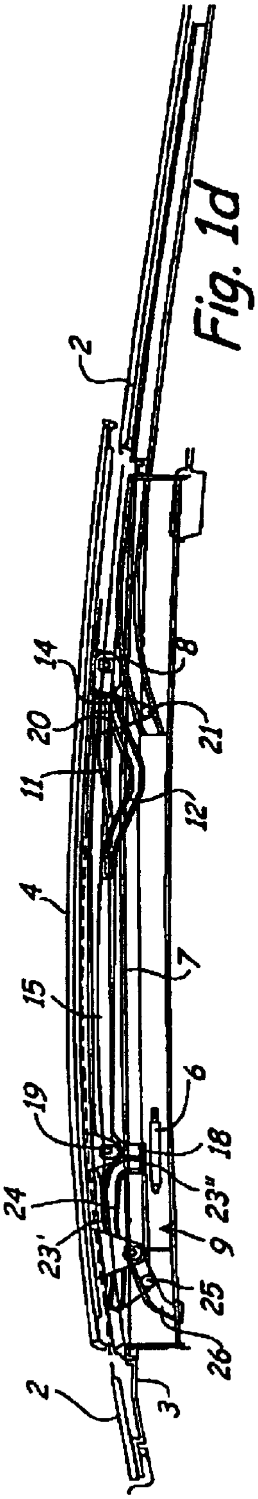

The roof assembly comprises a stationary part, such as a frame 3, and a closure element, in this case in the form of a rigid and preferably transparent panel 4, for example made of glass or of plastic material, which is movably supported by frame 3. The frame 3 can include portions about the roof opening 1 as necessary to provide rigidity. In this embodiment, panel 4 is movable between a closed position, in which roof opening 1 is closed and panel 4 is at least substantially coplanar with the fixed roof 2 (FIG. 1*b*) and a venting position in which the panel 4 is rearwardly inclined (FIGS. 1*a* and 8*a*). Furthermore, the panel 4 is movable between said closed position and an open position, in which panel 4 occupies a rearward position, at least partially above fixed roof 2, in which a very large part of opening 2 is cleared (FIGS. 1*f* and 8*f*).

An adjusting mechanism 5 is provided preferably on each longitudinal side of panel 4 for effecting the movements of panel 4. The mechanism 5 is driven by a driving slide 6 coupled to a driving element, such as a driving cable and a manual actuator, such as a crank, or a motor such as an electric motor, for driving the cable. The mechanism 5 supports panel 4 and is at least partially guided in a front longitudinal guide track 7, which forms part of or is mounted on frame 3. The front longitudinal guide track 7 extends along each side edge of roof opening 1, at a lower level than fixed roof 2. Furthermore, a rear longitudinal guide track 8 is preferably provided on each longitudinal side of the roof assembly, that is at the fixed roof, mainly rearward of the roof opening 1 and, in this case, at a lower level than the fixed roof 2.

The panel 4 includes a front support 9 and a lifting device 10 (not illustrated in FIG. 8a) positioned rearwardly thereof. They are both in engagement with the driving slide 6 which is guided in the front longitudinal guide track 7.

Figure 1E:
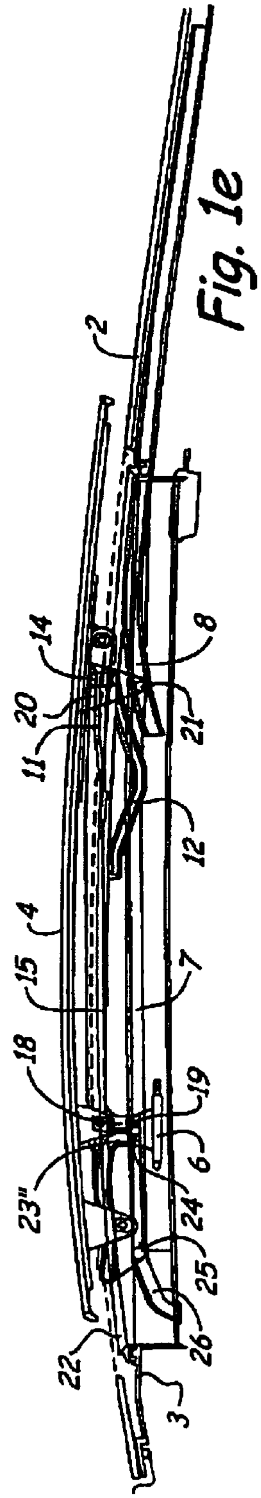
Figure 1F:
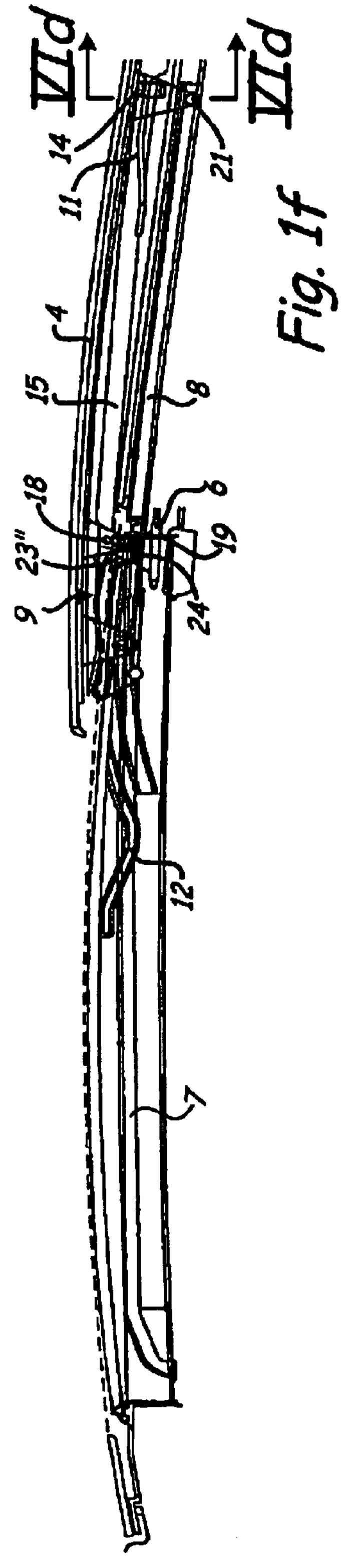
Figure 2:
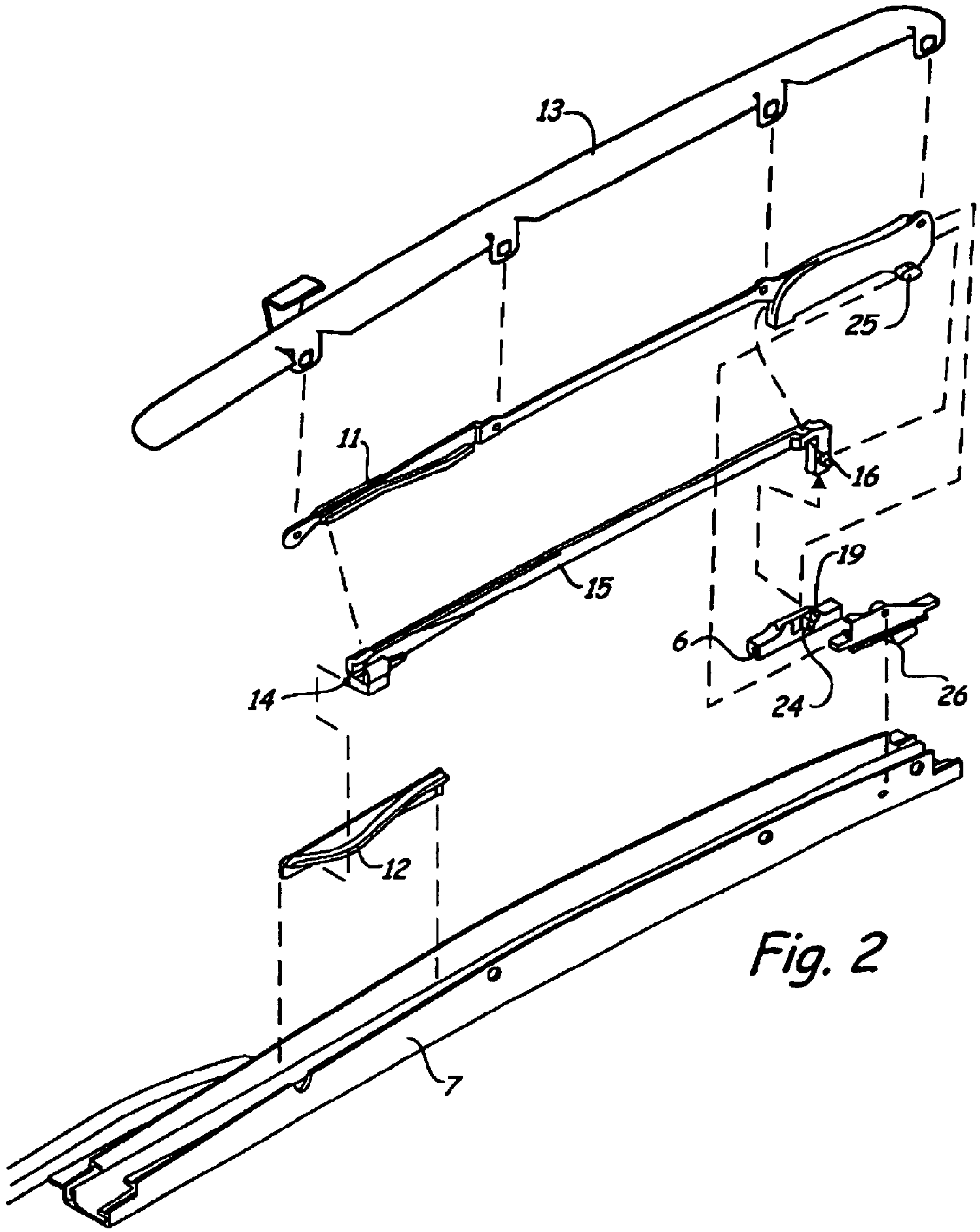
FIG. 2 is a perspective exploded view of the front longitudinal guide track and rear longitudinal guide track and the parts guided therein.

As is shown in FIG. 1 and 2, the lifting device 10 includes two guide curves 11 (illustrated on FIGS. 8a–8e) and 12 (illustrated on FIGS. 1a–1f), one (11) connected to a side bracket 13 of the panel 4, and one (12) fixed to the stationary part, i.e. the front longitudinal guide track 7. It further includes a lifting control element 14 which is continuously in engagement with guide curve 11 and also with guide curve 12 (as illustrated enlarged in FIGS. 9a–9f) when the lifting device is in operation. Guide curve 11 slightly runs upwardly closer to the panel 4 in a rearward direction away from driving slide 6 in the closed position of the panel 4. Guide curve 12 has a substantially V-shape, wherein the lifting control element 14 is at the bottom or lowermost position of the V-shape when the panel is in its closed position (FIGS. 1b and 9b). The front upward extending leg (closest to driving slide 6 in the closed position of the panel 4) of the V-shaped guide curve 12 mainly determines the lifting characteristics when the panel 4 is moved to the venting position, and the rear upward extending leg, mainly determines the start of the rearward movement of the panel 4.

Figure 3:
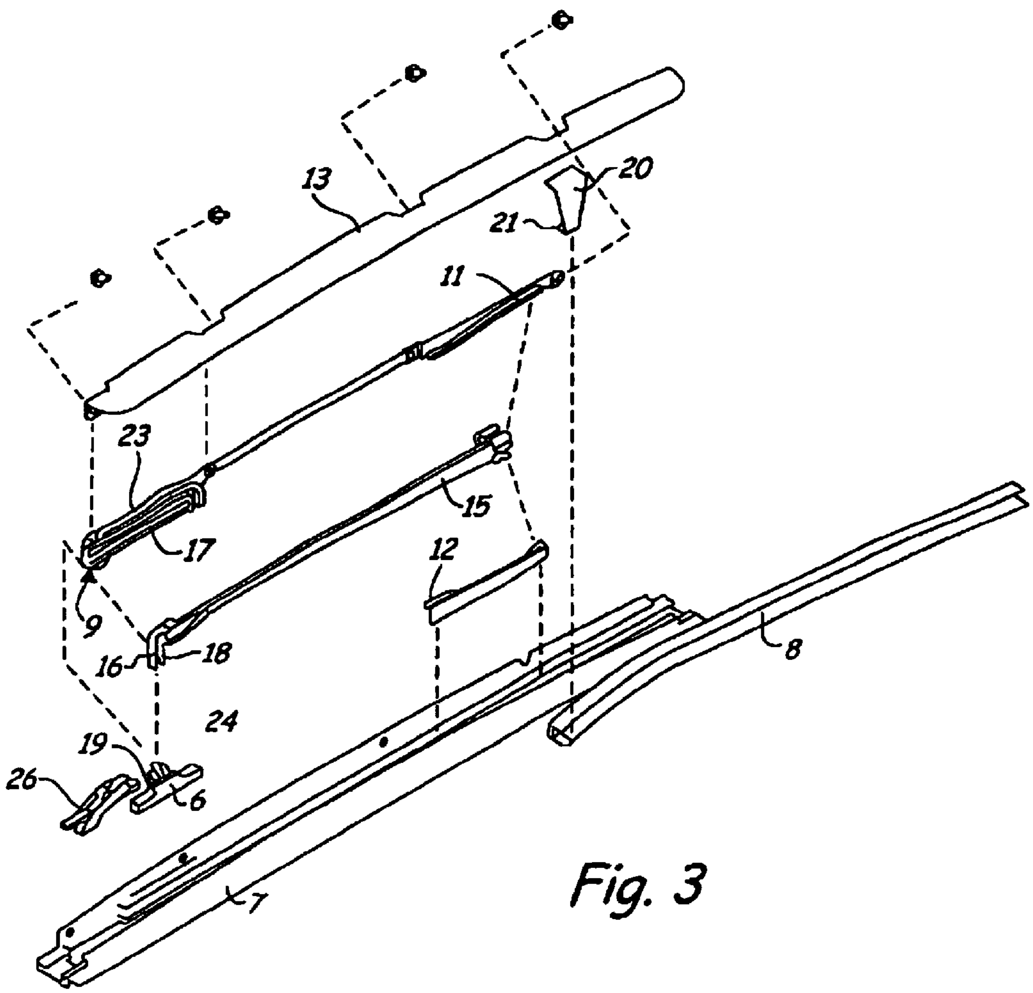
FIG. 3 is a view similar to that of FIG. 2, but showing the parts from the other side.
Figure 6A:
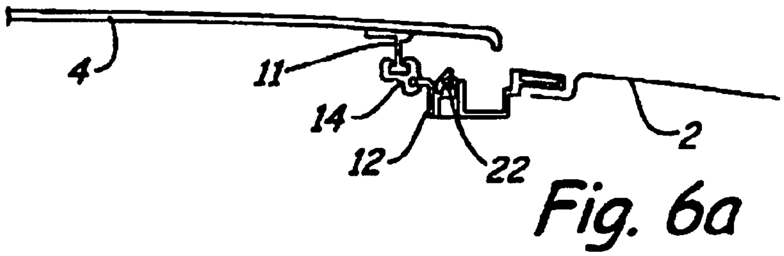
FIGS. 6*a*–6*d* are sectional views along the lines VIa—VIa to VId—VId in FIG. 1.
Figure 6B:
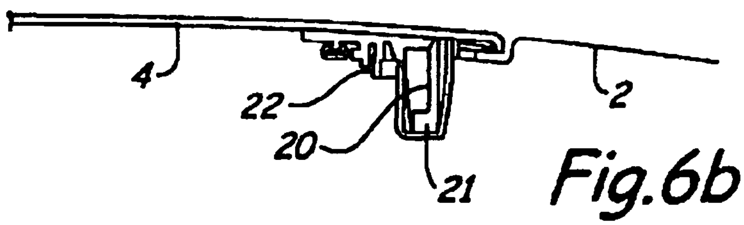
Figure 6C:
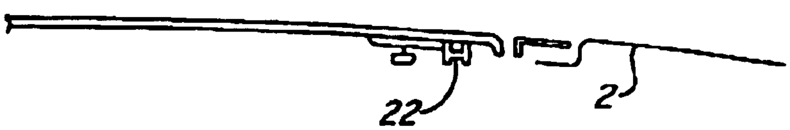
Figure 6D:
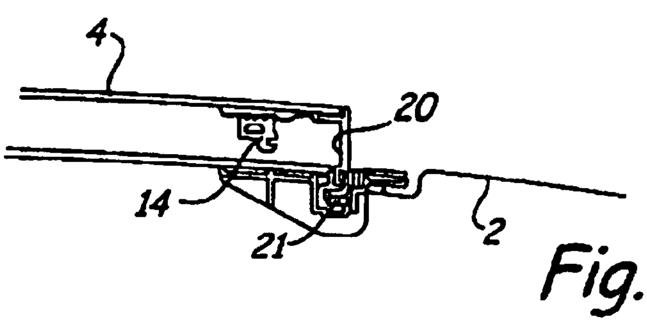

Referring to FIGS. 1 and 3, the guide curve 11 is connected to the front support 9 and the lifting control element 14 has a forward extension 15 carrying a transverse pin 16 engaging in a straight slot 17 in the front support 9, so as to guide sliding movements of the lifting control element 14 and its extension with respect to the panel 4. At the extension 15, on the other side of the pin 16, there is created a slot 18 substantially perpendicular to the front longitudinal guide track 7. In this slot 18 engages a pin 19 of the driving slide 6, so as to drive the lifting control element in the direction of the front longitudinal guide track 7, but allow free (limited) movement of the lifting control element 14 (and the panel 4) perpendicular thereto.

The lifting device 10 further includes a guiding device, here in the form of a rear slider 20 fixed to the panel 4, for example through the side bracket 13. The rear slider 20 has a transverse guide cam 21 which is adapted to engage the slot of the rear longitudinal guide track 8 from one side (FIG. 1c). Referring also to FIGS. 6a–6d, the rear slider 20 is laterally offset from the lifting device 10 and is arranged outwardly of a seal 22 which seals the panel 4 when it is in the closed position. The rear longitudinal guide track 8 also extends outwardly of this seal 22. The front longitudinal guide track 7 extends inwardly thereof. In the closed and venting positions of the panel 4, the guide cam 21 of the rear slider 20 is disengaged from the rear longitudinal guide track 8 (FIG. 1b), and becomes engaged (FIG. 1c) when the panel 4 is moved rearwardly from the closed position.

The front support 9 is connected to the driving slide 6 through a pin-slot connection including a slot 23 in the front support 9 and a second transverse pin 24 on the driving slide 6. Slot 23 has a front portion 23' that is substantially parallel to the front longitudinal guide track 7 but is slightly curved to cause a slight vertical movement of the front side of the panel 4 when the pin 24 runs through the slot portion 23'. The rear portion 23" of slot 23 is substantially perpendicular to the front longitudinal guide track 7 so that the driving slide 6 has a direct driving relation when pin 24 is positioned in slot portion 23".

The front support 9 is guided in the front longitudinal guide track 7 by means of a slide shoe 25 which is slidably engaged in a lateral slot of the front longitudinal guide track 7. The front longitudinal guide track 7 includes a front portion 26 sloping downwardly successively at two different angles to the front longitudinal guide track 7. The slide shoe 25 of front support 9 is in engagement with said front portion 26 when the panel 4 is in its front positions, either closed or in the venting position.

The operation of the roof assembly will be explained with reference to FIGS. 1a–1f and FIGS. 8a–8f.

Figure 8B:
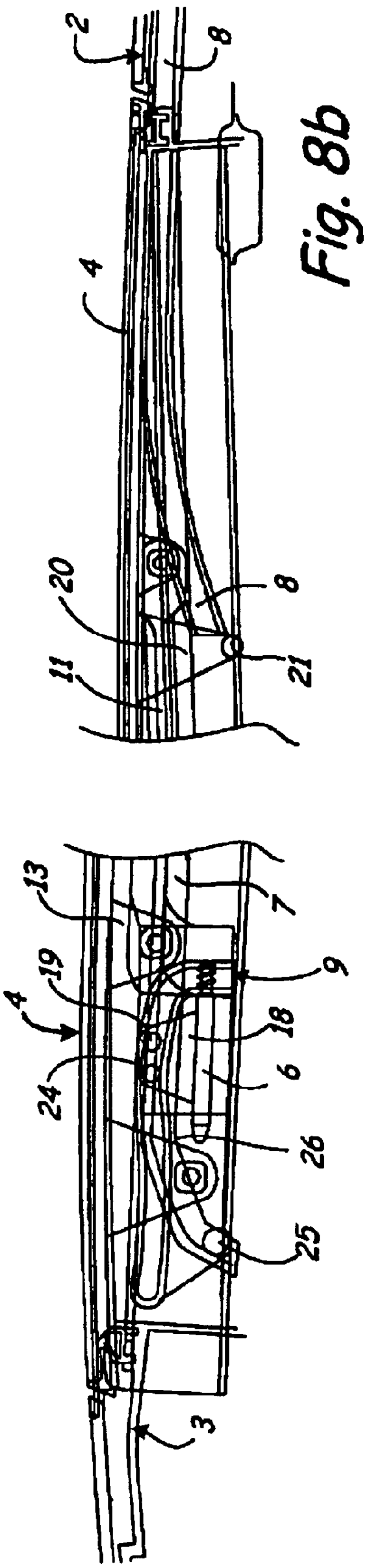
Figure 9A:
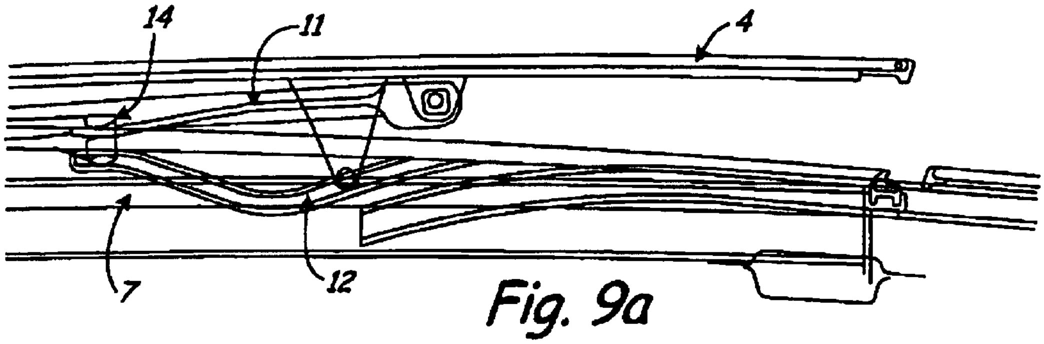
FIGS. 9*a*–9*f* are views corresponding to those of FIG. 1*a*–1*f* and collectively illustrate enlarged views of a lifting control element engaging guide curves.
Figure 9B:
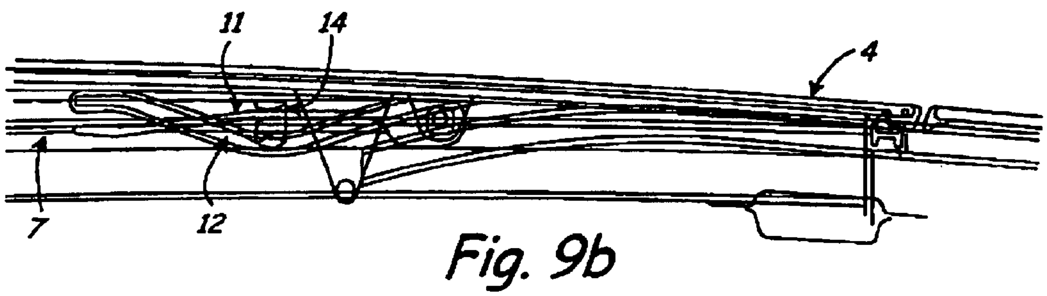
Figure 9C:
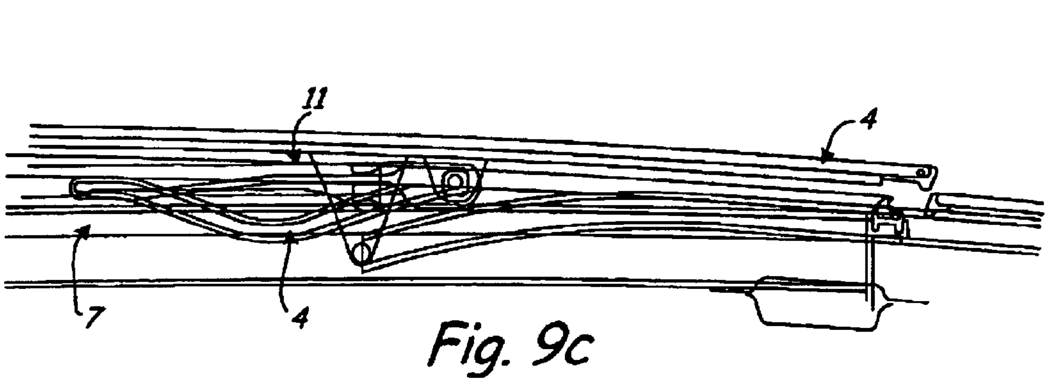
Figure 9D:
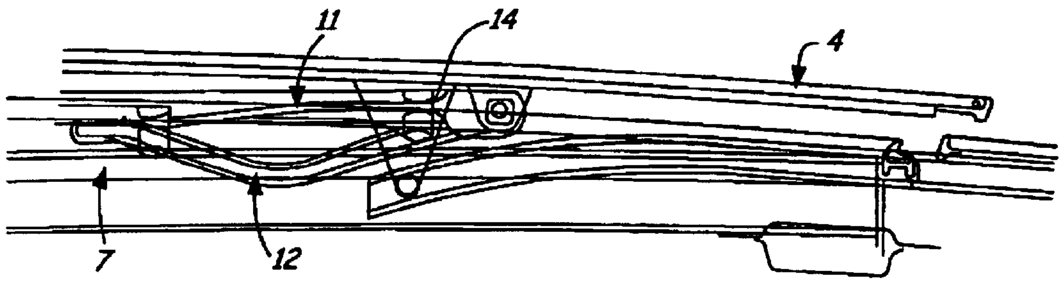
Figure 9E:
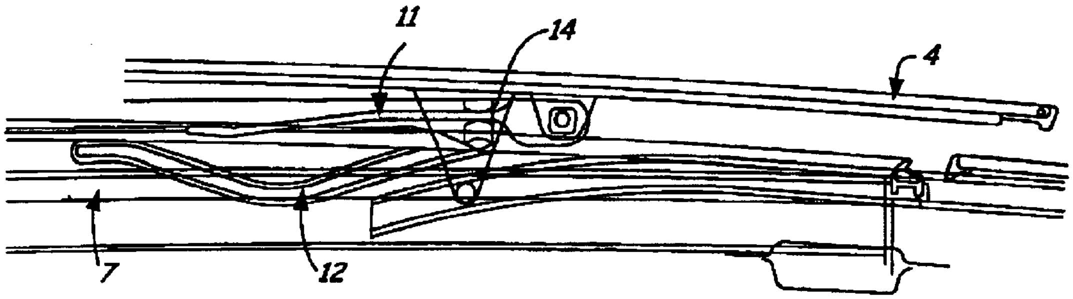
Figure 9F:
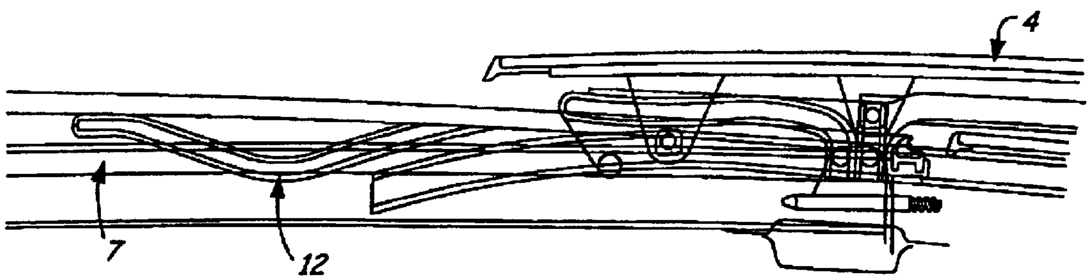

In FIGS. 1b and 8b, the panel 4 is in its closed position. In this position, the control lifting element 14 is at the bottom of the V-shaped guide curve 12. The guide cam 21 of the rear slider 20 is in front of the open front end of the rear longitudinal guide track 8. The slide shoe 25 of the front support 9 is in the front portion 26 of the front longitudinal guide track 7. The pin 19 on the driving slide 6 is at the transition of both portions 23' and 23" of the slot 23 in the front support 9.

When the driving slide 6 is moved forwardly (away from rear longitudinal guide track 8) in the front longitudinal guide track 7, the panel 4 is tilted to its inclined venting position as the lifting control element 14 has lifted the rear side of the panel 4 due to its travel along the corresponding leg of the V-shaped guide curve 12 and along the downwardly sloping part of the guide curve 13. The pin 19 on the driving slide 6 has travelled through the slightly curved slot portion 23' and has therefore kept the front edge of the panel 4 flush with the fixed roof 2 or a seal thereof.

When, starting from the closed position of FIGS. 1b and 8b, the driving slide 6 is moved rearwardly (toward rear longitudinal guide track 8) in the front longitudinal guide track 7, the panel 4 is moved to the position of FIG. 1c. The lifting control element 14 travels along the other leg of the V-shaped guide curve 12 moving the rear side of the panel 4 upwardly again but to a smaller extent, also due to the shape of the panel guide curve 11. In FIGS. 1c and 8c, the guide cam 21 of the rear slider 20 has started to enter the rear longitudinal guide track 8 and the pin 19 of the driving slide has started to enter the vertical slot portion 23" of the front support. The slide shoe 25 of the slightly moving front support 9 has left the most sloping front portion 26 of the front longitudinal guide track 7 and the front edge of panel 4 has been moved upwardly.

In the following position of FIGS. 1d and 8d, the guide cam 21 of the rear slider 20 has fully entered the rear longitudinal guide track 8, and the lifting control element 14 has left the guide curve 12. The lifting control element 14 has arrived at its end position of the sliding movement with respect to the panel 4. As the pin 19 of the driving slide 6 has entered the vertical slot portion 23" the driving slide 6 now directly drives the panel 4 in its sliding movement.

When the driving slide 6 is moved further rearwardly, the panel 4 is moved further back. The guide cam 21 of the rear slider 20 has taken over the support of the panel 4. The guide cam 21 moves through the inclined front portion of the rear longitudinal guide track 8 and as a result, the rear side of the panel 4 is moved rearwardly and upwardly. The front side of the panel 4 also moves rearwardly and upwardly as the slide shoe 25 travels through the sloping portion of the front longitudinal guide track 7.

In FIGS. 1e and 8e, the driving slide 6 has moved further back and the slide shoe 25 has now left the sloping front portion of the front longitudinal guide track 7. Pins 19 and 24 of the diving slide 6 can freely move in the vertical slots 18 and 23 of the lifting control element 14 and the front support 9 to allow vertical movements of the panel 4 without interfering with the driving operation of the driving slide 6.

In FIGS. 1*f* and 8*f*, the panel 4 has reached its fully open position in which a great part of the roof opening 1 has been cleared.

The return movement of the panel 4 to the front, closed position will be effected in an opposite manner.

Figures 7A, 7B, 7C, 7D, 7E:
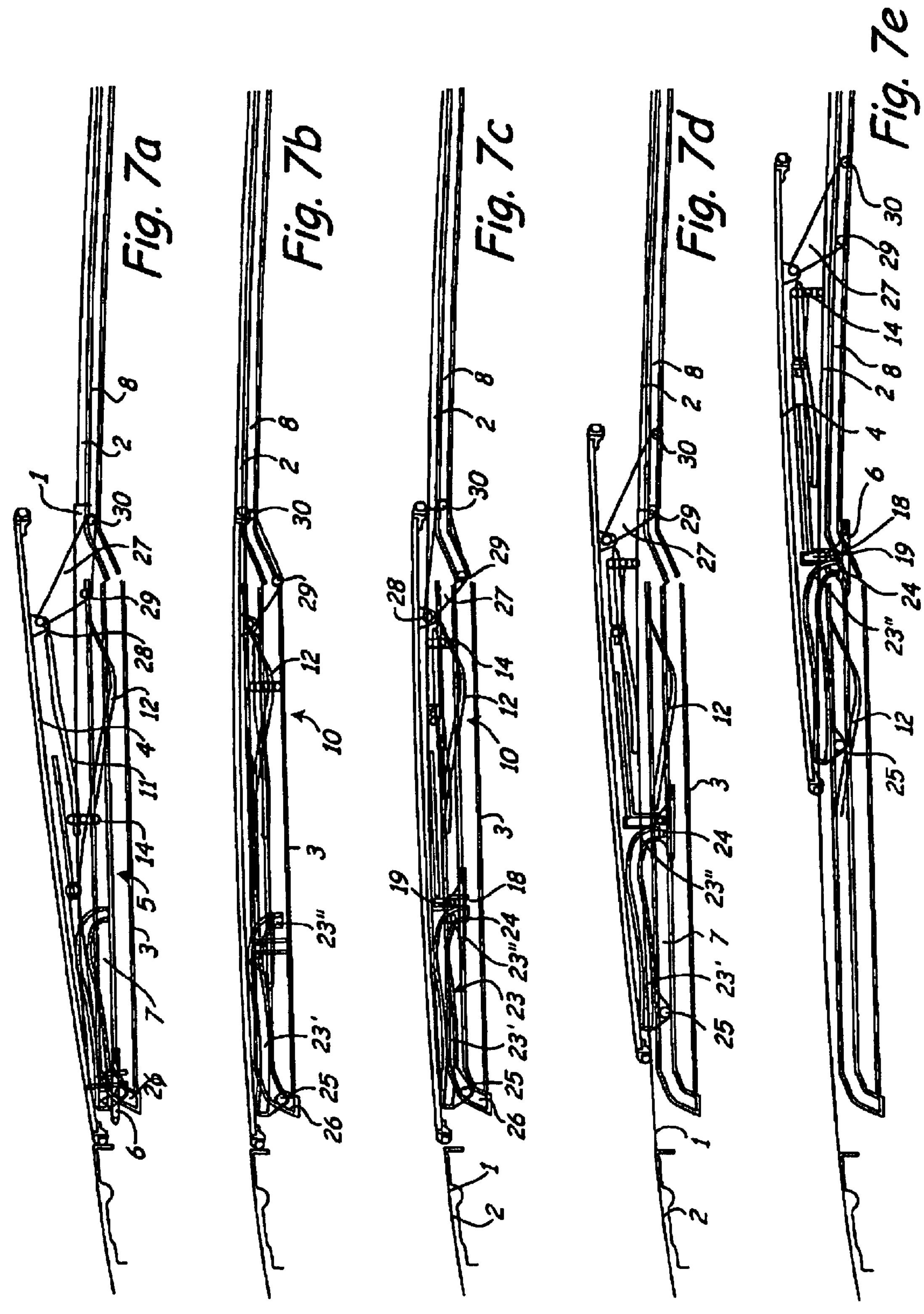
FIGS. 7*a*–7*e* are views corresponding to those of FIG. 1*a*–1*f* but showing an alternative embodiment of the roof assembly.

In FIG. 7 there is shown an alternative embodiment of the roof assembly. The main difference of this embodiment with the first embodiment is that the guiding device of the lifting device 10 is now constructed as a carriage 27 being pivotally connected to the panel 4 through pivot 28 and having two slide shoes 29 and 30 adapted to slide through the rear longitudinal guide track 8. As is shown in the drawings, the rear slide shoe 30 always remains in the straight portion of the rear longitudinal guide track 8, whereas the front slide shoe 29 travels through the inclined front portion and exits the rear longitudinal guide track 8 when the panel is in the front positions, i.e. closed and venting positions. During the sliding movement of the panel 4, the upward movement of the rear side of the panel is determined first by the rear portion of the guide curve 12 and then mainly by the tilting movement of the carriage 27 around the rear slide shoe 30.

From the foregoing it will be clear that the invention provides a very simple, yet robust, stable, reliable and low profile support and actuating mechanism for the closure element. The mechanism has a relatively small number of parts. The design is versatile and the roof panel can be combined with other panels.

The invention is not restricted to the exemplary embodiment as described above and shown in the drawing, which can be varied in several ways without departing from the scope of the claims. For example, it is possible that in the second embodiment both slide shoes 29 and 30 exit the rear longitudinal guide track 8 in the front positions of the closure element 4 and enter the guide track 8 when the closure element 4 is moved rearwardly. The guiding device performs both a support and lifting function in all embodiments shown and described above.

Although the present invention has been described with reference to preferred embodiments, workers skilled in the art will recognize that changes may be made in form and detail without departing from the spirit and scope of the invention.

What is claimed is:

1. A vehicle having an roof assembly for opening an opening (1) in its fixed roof (2), comprising:

a stationary part (3) mounted to the vehicle roof, wherein said stationary part is fitted with at least one front longitudinal guide track extending at least along the roof opening, and a rear longitudinal guide track that is mounted at least substantially rearward of the roof opening;

at least one closure element(4) movably supported by said stationary part;

an adjusting mechanism (5) including a driving slide (6) engaging at least one of the guide tracks, wherein said closure element is movable between an upwardly inclined venting position, through a closed position for closing the roof opening, and to an open, rearward position for being at least partially above the roof behind the roof opening, in which the roof opening is at least partially released, and wherein the closure element (4) is supported near its front side by a front support (9) movably guided by said front longitudinal guide track (7), and is supported rearwards thereof by a lifting device (10) comprising a guiding device (20, 21, 27) for engagement in said rear longitudinal guide track (8) upon rearward movement of the closure element (4), wherein the lifting device (10) is adapted to tilt the closure element (4) from the closed position in the roof opening (1) to the upwardly inclined venting position and to move the closure element (4) from the closed position rearwardly.

2. The vehicle according to claim 1, wherein the lifting device (10) includes at least one guide curve (11, 12) which is in engagement with a lifting control element (14) of the driving slide (6).

3. The vehicle according to claim 2, wherein the lifting device (10) includes two guide curves, one (11) connected to the closure element (4) and one (12) connected to the stationary part (3), the lifting control element (14) of the driving slide (6) being in engagement with both guide curves (11, 12) when in operation and being adjustable in a vertical direction.

4. A vehicle having an roof assembly for opening an opening (1) in its fixed roof (2), comprising:

a stationary part (3) mounted to the vehicle roof, wherein said stationary part is fitted with at least one front longitudinal guide track extending at least along the roof opening, and a rear longitudinal guide track that is mounted at least substantially rearward of the roof opening;

at least one closure element(4) movably supported by said stationary part; and an adjusting mechanism (5) including a driving slide (6) engaging at least one of the guide tracks, wherein said closure element is movable between a closed position for closing the roof opening, and an open, rearward position for being at least partially above the roof behind the roof opening, in which the roof opening is at least partially released, and where the closure element (4) is supported near its front side by a front support (9) movably guided by said front longitudinal guide track (7), and is supported rearwards thereof by a lifting device (10) comprising a guiding device (20, 21, 27) for engagement in said rear longitudinal guide track (8) upon rearward movement of the closure element (4), wherein the lifting device (10) is adapted to tilt the closure element (4) from the closed position in the roof opening (1) to an upwardly inclined venting position and to move the closure element (4) from the closed position rearwardly, wherein the lifting device (10) includes at least one guide curve (11, 12) which is in engagement with a lifting control element (14) of the driving slide (6), wherein the lifting device (10) includes two guide curves, one (11) connected to the closure element (4) and one (12) connected to the stationary part (3), the lifting control element (14) of the driving slide (6) being in engagement with both guide curves (11, 12) when in operation and being adjustable in a vertical direction, and wherein the guide curve (12) connected to the stationary part (3) is substantially V-shaped in a side view, said lifting control element (14) of the driving slide (6) being positioned at a bottom portion of the V-shape when the closure element (4) is in the closed position.

5. The vehicle according to claim 4, wherein the guiding device (20, 21, 28) is out of engagement with the rear longitudinal guide track (8) at least when the closure element (4) is in the venting position.

6. The vehicle according to claim 5, wherein the guiding device (20, 21, 27) comes in engagement with the rear longitudinal guide track (8) when the closure element (4) is moved rearwardly from the closed position, while said lifting control element (14) of the driving slide (6) then becomes disengaged from at least the guide curve (12)_ connected to the stationary part (3).

7. The vehicle according to claim 1, wherein the guiding device includes a rear slider (20) fixed to the closure element to move therewith, the rear slider being engagable with the rear longitudinal guide track (4).

8. The vehicle according to claim 1, wherein the guiding device includes a carriage (27) rotatably connected to the closure element (4) and having at least one and preferably two slide shoe (29, 30) which is in engagement with the rear longitudinal guide track (8).

9. The vehicle according to claim 7, wherein the rear longitudinal guide track (8) includes a front portion which is sloping downwardly in forward direction.

10. The vehicle according to one of claims 7, wherein the rear longitudinal guide track (8) is laterally offset from the front longitudinal guide track (7) and extends outwardly of a seal (22) of the closure element (4).

11. The vehicle according to claim 2, wherein the lifting control element is engaged with the driving slide (6) through a pin slot connection (18, 19), and wherein the slot (18) has at least a component perpendicular to the front longitudinal guide track (7).

12. A vehicle having an roof assembly for opening an opening (1) in its fixed roof (2), comprising:

a stationary part (3) mounted to the vehicle roof, wherein said stationary part is fitted with at least one front longitudinal guide track extending at least along the roof opening, and a rear longitudinal guide track that is mounted at least substantially rearward of the roof opening;

at least one closure element (4) movably supported by said stationary part; and an adjusting mechanism (5) including a driving slide (6) engaging at least one of the guide tracks, wherein said closure element is movable between a closed position for closing the roof opening, and an open, rearward position for being at least partially above the roof behind the roof opening, in which the roof opening is at least partially released, and where the closure element (4) is supported near its front side by a front support (9) movably guided by said front longitudinal guide track (7), and is supported rearwards thereof by a lifting device (10) comprising a guiding device (20, 21, 27) for engagement in said rear longitudinal guide track (8) upon rearward movement of the closure element (4), wherein the lifting device (10) is adapted to tilt the closure element (4) from the closed position in the roof opening (1) to an upwardly inclined venting position and to move the closure element (4) from the closed position rearwardly, wherein the driving slide (6) and the closure element (4) are engaged through a pin-slot connection (23, 24), of which the slot (23) has a first and second slot portion, the first slot portion (23') being substantially parallel to the front longitudinal guide track (7) and the second slot portion (23'') being substantially perpendicular to the front longitudinal guide track (7), the pin (24) being in engagement with the second slot portion (23'') when the closure element (4) is in rearwardly moved positions.

13. The vehicle according to claim 12, wherein the first slot portion (23')is slightly curved to cause the front of the closure panel (4) to move in vertical direction when the pin (24) runs through the slot (23).

14. The vehicle according to claim 12, wherein the front longitudinal guide track (7) has a front portion sloping downwardly at an angle to the front longitudinal guide track(7), the front support (9) being in engagement with said front portion when the closure element (4) is in its front positions.

15. A roof assembly for use in a vehicle having an opening (1) in a fixed roof (2), the roof assembly comprising:

a stationary part (3) mountable to the vehicle roof, wherein said stationary part is fitted with at least one front longitudinal guide track (7) extending at least along the roof opening, and a rear longitudinal guide track (8) that is mounted at least substantially rearward of the roof opening;

at least one closure element (4) movably supported by said stationary part;

an adjusting mechanism (5) including a driving slide (6) engaging at least one of the guide tracks, wherein said closure element (4) is movable between an upwardly inclined venting position through a closed position for closing the roof opening (1), and to an open, rearward position where the closure element (4) is substantially parallel to the longitudinal guide tracks (7, 8); and where the closure element (4) is supported near its front side by a front support (9) movably guided by said front longitudinal guide track (7), and is supported rearwards thereof by a lifting device (10) comprising a guiding device (20, 21, 27) for engagement in said rear longitudinal guide track (8) upon rearward movement of the closure element (4), wherein the lifting device (10) is adapted to tilt the closure element (4) from the closed position in the roof opening (1) to an upwardly inclined venting position and to move the closure element (4) from the closed position rearwardly.

16. The roof assembly according to claim 15, wherein the lifting device (10) includes at least one guide curve (11,12) which is in engagement with a lifting control element (14) of the driving slide (6).

17. A roof assembly for use in a vehicle having an opening (1) in a fixed roof (2), the roof assembly comprising:

a stationary part (3) mountable to the vehicle roof, wherein said stationary part is fitted with at least one front longitudinal guide track (7) extending at least along the roof opening, and a rear longitudinal guide track (8) that is mounted at least substantially rearward of the roof opening;

at least one closure element (4) movably supported by said stationary part;

an adjusting mechanism (5) including a driving slide (6) engaging at least one of the guide tracks, wherein said closure element (4) is movable between a closed position for closing the roof opening (1), and an open, rearward position where the closure element (4) is substantially parallel to the longitudinal guide tracks (7, 8), wherein the closure element (4) is supported near its front side by a front support (9) movably guided by said front longitudinal guide track (7), and is supported rearwards thereof by a lifting device (10) comprising a guiding device (20, 21, 27) for engagement in said rear longitudinal guide track (8) upon rearward movement of the closure element (4), wherein the lifting device (10) is adapted to tilt the closure element (4) from the closed position in the roof opening (1) to an upwardly inclined venting position and to move the closure element (4) from the closed position rearwardly, wherein the lifting device (10) includes two guide curves (11, 12) comprising one guide curve (11) connected to the closure element (4) and another guide curve (12) connected to the stationary part (3), and wherein the lifting device 10 includes a lifting control element (14) in engagement with both guide curves (11,12) when in operation and being adjustable in a vertical direction.

18. The roof assembly according to claim 17, wherein the guide curve (12) connected to the stationary part (3) is substantially V-shaped in a side view, said lifting control element (14) of the driving slide (6) being positioned at a bottom portion of the V-shape when the closure element (4) is in the closed position.

19. The roof assembly according to claim 18, wherein the guiding device (20, 21, 28) is out of engagement with the rear longitudinal guide track (8) at least when the closure element (4) is in the venting position.

20. The roof assembly according to claim 19, wherein the guiding device (20, 21, 27) comes in engagement with the rear longitudinal guide track (8) when the closure element (4) is moved rearwardly from the closed position, while said lifting control element (14) of the driving slide (6) then becomes disengaged from at least the guide curve (12) connected to the stationary part (3).

21. The roof assembly according to claim 15, wherein the guiding device includes a rear slider (20) fixed to the closure element to move therewith, the rear slider being engagable with the rear longitudinal guide track (8).

22. The roof assembly according to claim 15, wherein the guiding device includes a carriage (27) rotatably connected to the closure element and having at least one slide shoe (29, 30) which is in engagement with the rear longitudinal guide track (8).

23. The roof assembly according to claim 22, wherein the rear longitudinal guide track (8) includes a front portion which is sloping downwardly in forward direction.

24. The roof assembly according to claim 21, wherein the rear longitudinal guide track (8) is laterally offset from the front longitudinal guide track (7) and extends outwardly of a seal of the closure element (4).

25. The roof assembly according to claim 17, wherein the lifting control element (14) is engaged with the driving slide (6) through a pin-slot connection (18, 19), and wherein the slot (18) has at least a component perpendicular to the front longitudinal guide track (7).

26. A roof assembly for use in a vehicle having an opening (1) in a fixed roof (2), the roof assembly comprising:

a stationary part (3) mountable to the vehicle roof, wherein said stationary part is fitted with at least one front longitudinal guide track (7) extending at least along the roof opening, and a rear longitudinal guide track (8) that is mounted at least substantially rearward of the roof opening;

at least one closure element (4) movably supported by said stationary part;

an adjusting mechanism (5) including a driving slide (6) engaging at least one of the guide tracks, wherein said closure element (4) is movable between a closed position for closing the roof opening (1), and an open, rearward position where the closure element (4) is substantially parallel to the longitudinal guide tracks (7, 8), wherein the closure element (4) is supported near its front side by a front support (9) movably guided by said front longitudinal guide track (7), and is supported rearwards thereof by a lifting device (10) comprising a guiding device (20, 21, 27) for engagement in said rear longitudinal guide track (8) upon rearward movement of the closure element (4), wherein the lifting device (10) is adapted to tilt the closure element (4) from the closed position in the roof opening (1) to an upwardly inclined venting position and to move the closure element (4) from the closed position rearwardly, and, wherein the driving slide (6) and the closure element (4) are engaged through a pin-slot connection (23, 24), of which the slot (23) has a first and second slot portion, the first slot portion (23') being substantially parallel to the front longitudinal guide track (7) and the second slot portion (23") being substantially perpendicular to the front longitudinal guide track (7), the pin being in engagement with the second slot portion (23") when the closure element (4) is in rearwardly moved positions.

27. The roof assembly according to claim 26, wherein the first slot portion (23') is slightly curved to cause the front of the closure panel to move in vertical direction when the pin runs through the slot.

28. The roof assembly according to claim 27, wherein the front longitudinal guide track (7) has a front portion (26) sloping downwardly at an angle to the front longitudinal guide track (7), the front support (26) being in engagement with said front portion (26) when the closure element (4) is in its front positions.

29. A vehicle having an roof assembly for opening an opening (1) in its fixed roof (2), comprising:

a stationary part (3) mounted to the vehicle roof, wherein said stationary part is fitted with at least one front longitudinal guide track extending at least along the roof opening, and a rear longitudinal guide track that is mounted at least substantially rearward of the roof opening;

at least one closure element(4) movably supported by said stationary part;

an adjusting mechanism (5) comprising:

a driving slide (6) engaging at least one of the guide tracks, wherein said closure element is movable between an upwardly inclined venting position above the roof opening, through a closed position for closing the roof opening, and to an open, rearward position for being at least partially above the roof behind the roof opening, and wherein the closure element (4) is supported near its front side by a front support (9) movably guided by said front longitudinal guide track (7); and a lifting device (10) supporting the closure element (4) rearwards thereof, the lifting device (10) comprising a guiding device (20, 21, 27, 30) for engagement in said rear longitudinal guide track (8) and a lifting control element (14), wherein the guiding device (20, 21, 27, 30) moves rearward to move the closure element (4) from the closed position to the open, rearward position, and wherein the lifting control element (14) moves forward to move the closure element (4) from the closed position to the upwardly inclined venting position.

30. The vehicle of claim 29, wherein the lifting control element (14) is selectively movable in the forward direction to selectively incline the closure element (4).

* * * * *